United States Patent [19]

Fima

[11] Patent Number: 4,739,660
[45] Date of Patent: Apr. 26, 1988

[54] ACCELEROMETER WITH VIBRATING ELEMENT

[75] Inventor: Henri Fima, Chabeuil, France

[73] Assignee: Crouzet, Paris, France

[21] Appl. No.: 885,205

[22] Filed: Jul. 14, 1986

[30] Foreign Application Priority Data

Jul. 17, 1985 [FR] France ................................ 85 11056

[51] Int. Cl.⁴ ............................................. G01P 15/10
[52] U.S. Cl. ............................ 73/517 AV; 73/DIG. 1
[58] Field of Search ........... 73/517 AV, 497, DIG. 1, 73/517 R; 310/329, 346

[56] References Cited

U.S. PATENT DOCUMENTS 4,104,920 8/1978 Albert et al. .................. 73/517 AV

FOREIGN PATENT DOCUMENTS 3038660 5/1982 Fed. Rep. of Germany .
1596982 9/1981 United Kingdom .
2133152 7/1984 United Kingdom .

*Primary Examiner*—John Chapman
*Attorney, Agent, or Firm*—Stevens, Davis, Miller & Mosher

[57] ABSTRACT

An accelerometer is provided comprising an inertial mass connected to a support by means of a hinge and a vibrating element whose ends are respectively fixed to the inertial mass and to the support. The hinge is disposed in the median plane of the vibrating element and the centers of gravity of the vibrating element and of the inertial mass are merged. The effects of internal thermal stresses, which vitiate the results, are considerably reduced.

6 Claims, 1 Drawing Sheet

ACCELEROMETER WITH VIBRATING ELEMENT

BACKGROUND OF THE INVENTION

1. Field of the Invention

The present invention relates to an accelerometer of the kind comprising a support, an inertial mass connected to the support by a hinge means, and an elongate vibrating element whose ends are respectively connected to the inertial mass and to the support.

2. Description of the Prior Art

This type of accelerometer, described for example in U.S. Pat. No. 4,517,841 has the advantage of delivering information easy to put into digital form.

This information is the vibration frequency of the vibrating element, or several vibration frequencies in the case of multimode operation, which varies on the one hand as a function of the temperature of this vibrating element and on the other as a function of the longitudinal force applied to said element. This force is the sum of a quantity proportional to the magnitude to be measured, which is the acceleration of the inertial mass, multiplied by its mass, and of a stress of thermal origin dependent on the temperature distribution inside the structure, and on the arrangement of this structure.

At uniform temperature, this stress of thermal origin is due to the difference of the expansion coefficients between the materials forming the support and the vibrating element. The value of this stress depends on the one hand on the angular stiffness of the articulation of the inertial mass on the support and on the other hand on the effective angular stiffness of the vibrating element, generally made from quartz, at the level of the embedment.

It is known to reduce the influence of the temperature of the vibrating element on the accuracy of the measurements by using for example two vibrating elements instead of one, arranged in differential fashion, so that the effects related to the acceleration to be measured are added whereas the effects related to the temperature of the vibrating elements are compensated and cancelled out. Such compensation is described in U.S. Pat. No. 4,517,841 mentioned above as well moreover as in the German application No. 30 38660—although, in this latter case, the transducers used are not elongate vibrating elements but piezoelectric transducers in the form of plates.

Naturally, even if that is not its first aim, such a compensation causes a reduction of the effects of the stress of thermal origin exerted on each vibrating element, in the case where the temperature of the whole of the structure is uniform.

However, under rapidly varying thermal conditions, there appear inside the structure thermal gradients such that the effects of the thermal stresses are very considerable.

The present invention aims at overcoming the above drawbacks by providing, in particular for aeronautic and spatial uses, a reduction of the non compensatable thermal stress and so a reduction of the measurement errors.

SUMMARY OF THE INVENTION

For this, the invention relates to an accelerometer of the above defined type characterized by the fact that the axis of the hinge means of the inertial mass is situated in the mid-perpendicular plane of the vibrating element so that the vibrating element is deformed in the shape of an arc of a circle when the inertial mass moves about its hinge means.

In an accelerometer of this type, calculation shows that the angular stiffness of the vibrating element is minimum, because this latter is deformed in an arc of a circle for a small rotation of the inertial mass about its hinge means. This results in reducing the thermal stress to the possible minimum. Thus, the drift of thermal origin may be a hundred times smaller than that existing in known devices of this type.

Advantageously, the center of gravity of the inertial mass merges with the center of gravity of the vibrating element.

Because the axis of the hinge means of the inertial mass is in the mid-perpendicular plane of the beam, the second condition allows any shear stress on said hinge means to be cancelled out, whatever the acceleration of the inertial mass in size and in direction.

Advantageously again, the accelerometer is disposed in a hermetic enclosure from which the air has been emptied and which has been filled with helium at a low pressure, of the order of 10 millibars. This gas, of a good thermal conductivity, considerably reduces the thermal time constant between the support and the inertial mass and all the more so as the distance between these two elements is reduced. Thus, the thermal gradients inside the structure are minimized because of the improvement of the heat exchanges.

BRIEF DESCRIPTION OF THE DRAWINGS

The present invention will be better understood from the following description of the preferred embodiment of the accelerometer of the invention, made with reference to the accompanying drawings in which.

DESCRIPTION OF THE PREFERRED EMBODIMENT

Figure 1:
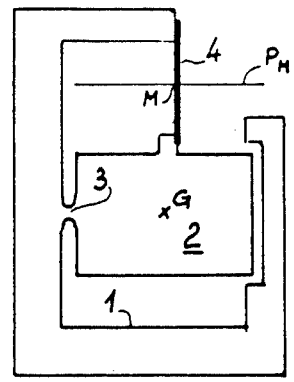
FIG. 1 shows a typical accelerometer of the prior art.

Such as shown in FIG. 1, an accelerometer of the prior art comprises essentially a more or less rigid support 1, an inertial mass 2 hinged by means of a hinge 3. Between mass 2 and a point on the support is fixed the vibrating element 4 which is thus subjected to the acceleration forces of the inertial mass. It can be readily seen that the axis of hinge 3 is not in the mid-perpendicular plane PM of the vibrating element, in the case in point a beam cut from a quartz crystal. It can also be seen that the center of gravity M of the beam 4 and G of the inertial mass are not merged. On the other hand, in FIG. 2, the inertial mass 2 and support 1 are cut from a single block so that hinge 3 is in the median plane PM of the vibrating element 4. Furthermore, the centers of the gravity G and M are merged. As we saw above, the position of the center of gravity G of the inertial mass 2 is chosen so that the sensitive axis of the accelerometer merges with the axis of the beam 4 and so that the shear stress on the hinge 3 is zero.

The ends of the beam 4 are connected to base 1 and to the inertial mass 2 by means of two bob-weights 41 and two heels 40. The heels 40 are for example bonded to base 1 at 11 and to the inertial mass at the level of a protuberance 20.

The two identical bob-weights 41 serve, in a way known per se, for the vibratory decoupling of beam 4, which vibrates under flexion in the plane of the quartz wafer.

A recess 21 formed in the inertial mass frees the beam 4 and the bob-weights 41 from the rest of the device so that it may vibrate in all freedom.

The inertial mass 2 has the general U-shape which alows its center of gravity G to be brought into concordance with the center of gravity M of beam 4.

In addition the axis XY of the hinges 3 is situated in the median plane of beam 4.

Figure 2:
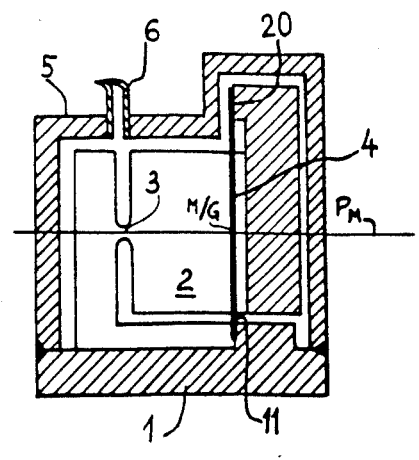
FIG. 2 is a general diagram of an accelerometer in accordance with the invention.
Figure 3:
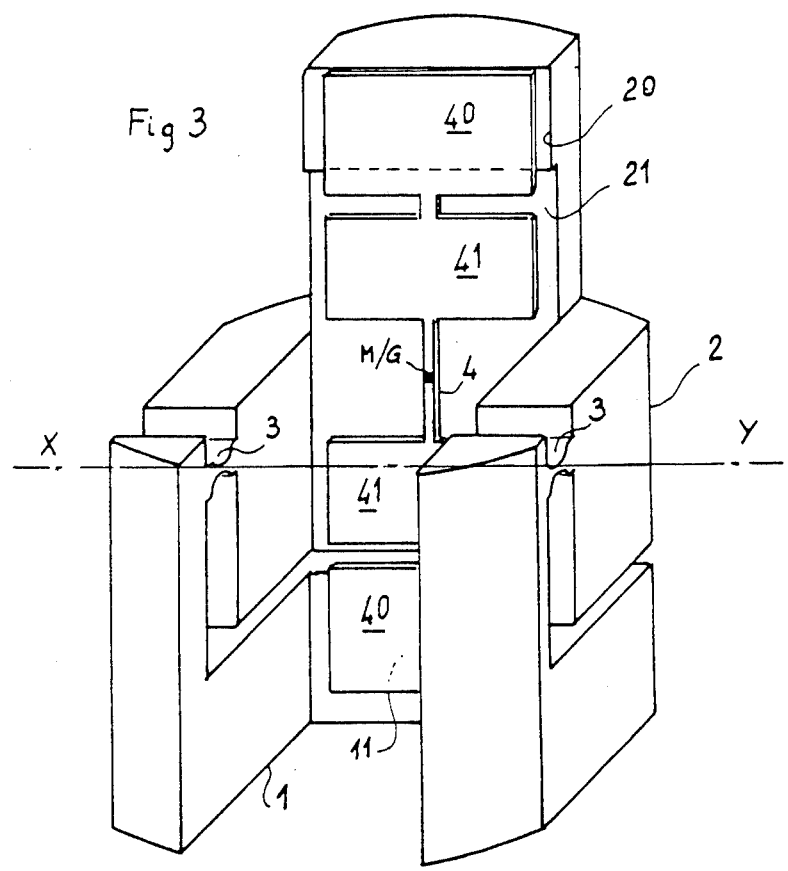
FIG. 3 is one embodiment of an accelerator in accordance with the invention showing the position of the vibrating element with respect to the support and the inertial mass as well as its hinge means.

Finally, as shown in FIG. 2, enclosure 5 mates with the shapes of the inertial mass, with a clearance of the order of 0.8 mm maximum. This enclosure is emptied of air which is then replaced by a light gas, form example helium, at a low pressure between 5 and 10 millibars, through a tailpiece 6. The device of the invention allows accelerometers to be constructed which are reliable, inexpensive and very insensitive to ambient termperature variations.

By associating in orthogonal directions accelerometers may be fabricated giving the different components of the acceleration in these directions.

What is claimed is:

1. An accelerometer of the type comprising a support, an inertial mass, a hinge means connecting the inertial mass to the support and an elongate vibrating element whose ends are respectively connected to the inertial mass and to the support, wherein a hinge axis of said hinge means of the inertial mass is situated in a midperpendicular plane of the vibrating element so that the vibrating element is deformed along an arc of a circle in a plane perpendicular to the hinge axis when the inertial mass moves about said hinge means.

2. The accelerometer as claimed in claim 1, wherein said inertial mass has a center of gravity which merges with a center of gravity of the vibrating element.

3. The accelerometer as claimed in claim 1, wherein the vibrating element is a beam.

4. The accelerometer as claimed in claim 1, wherein said support, said inertial mass and said vibrating element are disposed in an hermetic enclosure emptied of air and filled with helium at a low pressure of the order of 10 millibars.

5. The accelerometer as claimed in claim 2, wherein the vibrating element is a beam.

6. The accelerometer as claimed in claim 2, disposed in an hermetic enclosure emptied of air and filled with helium at a low pressure of the order of 10 millibars.

* * * * *